UNITED STATES PATENT OFFICE.

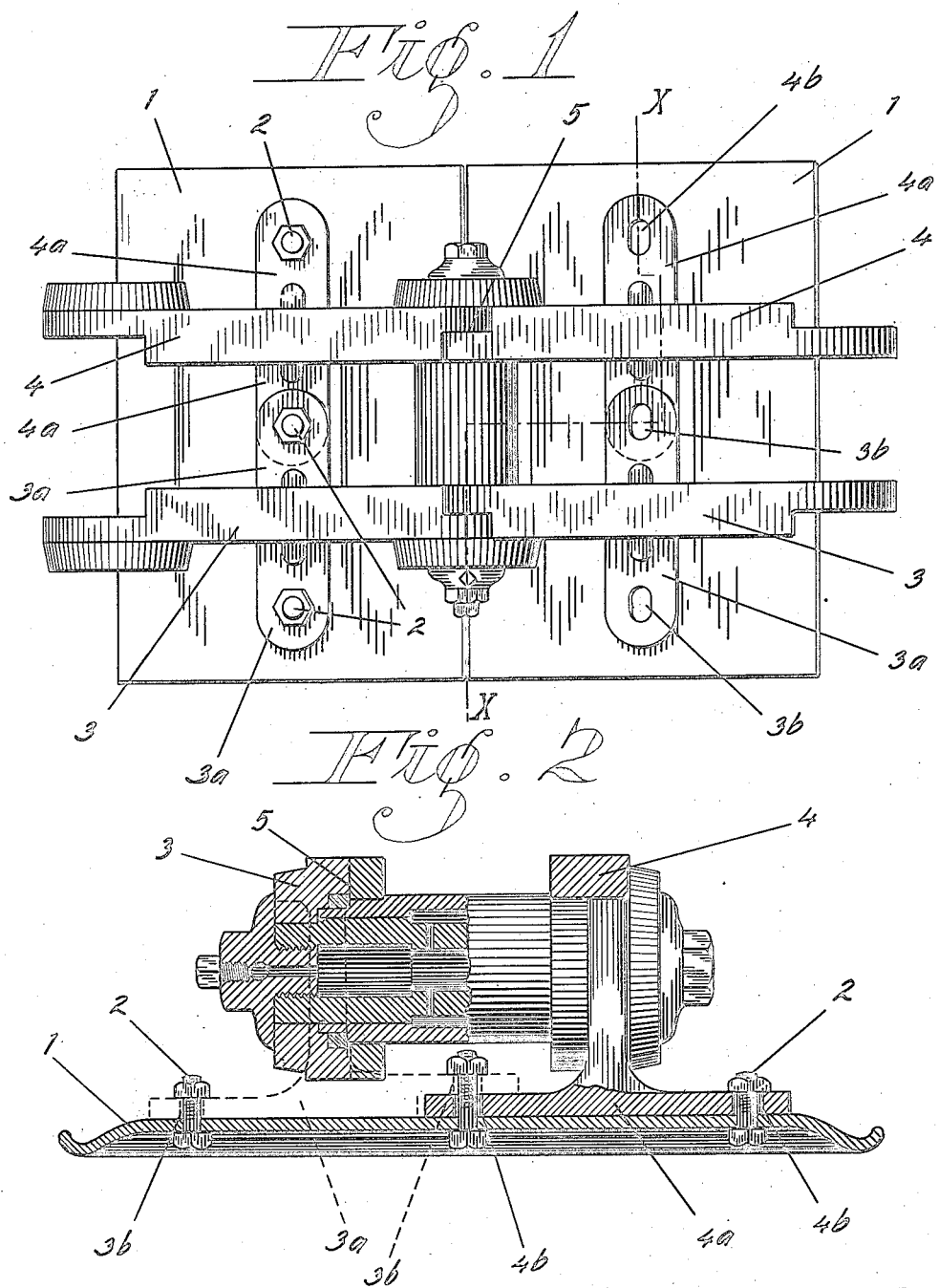

JOHN H. DAVIS, OF STOCKTON, CALIFORNIA.

LINK CONSTRUCTION FOR TRACTOR-TREADS.

1,289,409.     Specification of Letters Patent.     Patented Dec. 31, 1918.

Original application filed May 24, 1917, Serial No. 170,677. Divided and this application filed October 15, 1917. Serial No. 196,649.

*To all whom it may concern:*

Be it known that I, JOHN H. DAVIS, a citizen of the United States, residing at Stockton, in the county of San Joaquin, State of California, have invented certain new and useful Improvements in Link Construction for Tractor-Treads; and I do declare the following to be a full, clear, and exact description of the same, reference being had to the accompanying drawings, and to the characters of reference marked thereon, which form a part of this application.

This invention relates to improvements in the construction of an endless track for tractor treads, and is a divisional part of my application filed May 24th, 1917, Serial No. 170,677. This present invention relates to improvements in the link construction to which the tread feet or plates are fastened.

The object of the invention is to construct each link of the tread chain of two members, having projecting studs by means of which the plates are secured thereto. The adjacent studs, between the two plates, overlap each other, and all of the studs have elongated bolt holes, whereby the relative position of the parts may be altered to take up any wear which may occur at the joints between the links.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a bottom plan view of a pair of the tread plates showing the link construction, the bolts being removed from one of the links in order to show the elongated slots.

Fig. 2 is a section taken on a line $x$—$x$ of Fig. 1.

Referring now more particularly to the characters of reference of the drawings, the numeral 1 designates the tread plates or feet which are bolted to the chain links of the endless track by means of bolts 2. In my improved link construction, each of the links consists of two members 3 and 4, provided with projecting studs $3^a$ and $4^a$ respectively. Each of the studs $3^a$ is provided with an elongated bolt hole $3^b$, while the studs $4^a$ are each provided with similar bolt holes $4^b$ through which bolt holes bolts 2 project. The adjacent studs $3^a$ and $4^a$ between the members 3 and 4, overlap and their corresponding bolt holes register with each other. The ends of the adjacent members 3 and 4 are linked together with any suitable joint structure as at 5, but preferably of that structure specified in the above entitled application for patent. By having each link of the chain made of two separate members, bolted together in the manner specified, the same may be quickly assembled or taken apart.

By reason of the elongated bolt holes mentioned, when any wear occurs at the joint 5 between the bearing surfaces of the link members, this may be readily taken up by loosening the bolts and moving the link sections toward each other, and the bolts can then again be tightened.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

The combination with a track plate for a tractor track section, of a link comprising two members, each member having projecting studs to which the track plate is fastened, the adjacent studs between the members overlapping each other and being removably connected together.

In testimony whereof, I affix my signature in the presence of two witnesses.

JOHN H. DAVIS.

Witnesses:
    VERADINE WARNER,
    BERNARD PRIVAT.